United States Patent [19]
Advena et al.

[11] Patent Number: 6,099,744
[45] Date of Patent: Aug. 8, 2000

[54] TEST SAMPLE FABRICATION TECHNIQUE

[75] Inventors: Donna J. Advena, Vienna; Conrad W. Terrill, Lorton, both of Va.

[73] Assignee: The United States of Americas as represented by the Secretary of the Army, Washington, D.C.

[21] Appl. No.: 09/084,874

[22] Filed: May 28, 1998

[51] Int. Cl.$^7$ ..................................... H01G 9/00
[52] U.S. Cl. ................... 216/6; 438/51; 438/54; 216/2
[58] Field of Search ............... 216/2, 6; 438/51, 438/54, 462, 700

[56] References Cited

U.S. PATENT DOCUMENTS

| | | | |
|---|---|---|---|
| 5,453,347 | 9/1995 | Bullington et al. | 438/3 |
| 5,644,838 | 7/1997 | Beratan | 29/840 |
| 5,757,000 | 5/1998 | Rogowski et al. | 250/332 |
| 5,891,512 | 4/1999 | Kawata et al. | 427/74 |

*Primary Examiner*—Randy Gulakowski
*Assistant Examiner*—Shamim Ahmed
*Attorney, Agent, or Firm*—Milton W. Lee; John E. Holford; Alain L. Bashore

[57] ABSTRACT

A fabrication technique for a test sample to characterize pyroelectric and ferroelectric thin films for use in uncooled infrared focal plane arrays operated at a nominal 60 Hz. Most layers are patterned by a lift off technique, and those layers that are not lifted off are chemically etched or ion milled. The pyroelectric layer is thermally insulated from the substrate by a thick film layer of $ZrO_2$. The pyroelectric layer is sandwiched between metal layers to form a capacitor. Direct measurement of the voltages between the capacitor plates, and of the temperature of these plates, results in a direct measurement of thin film temperature responsivity.

1 Claim, 1 Drawing Sheet

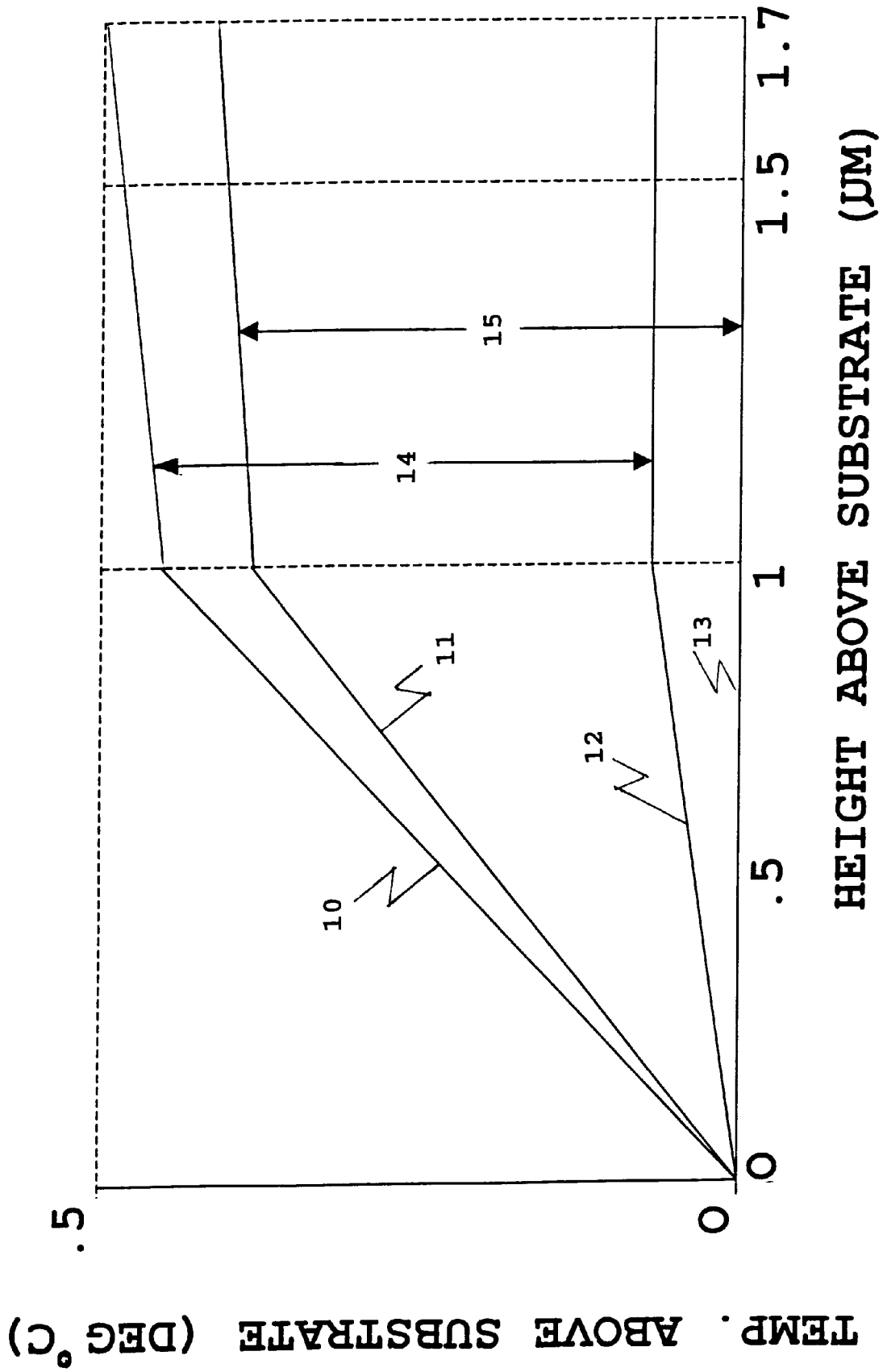

TEST SAMPLE FABRICATION TECHNIQUE

BACKGROUND OF THE INVENTION

1. Field of the Invention

The present invention generally relates to test sample fabrication techniques and more specifically, to a infrared detector material test sample fabrication technique.

2. Description of Prior Art

A potential advancement for high performance in these uncooled systems is the development of a thin-film pyroelectric detector material for use in uncooled infrared focal plane array (IRFPA) systems. Characterization of these thin film detector materials requires the development of techniques different from those used to-date for bulk pyroelectric and ferroelectric infrared detector materials. With the bulk materials, quasi-static characterization has been used most often, particularly in the early screening stages, to select promising materials for further study. For application in IRFPAs, these quasi-static measurements have limited usefulness, since they are not accurate predictors of device performance at dynamic (60 Hz) frame rates.

In cases where numerous samples of a single material are to be characterized, a method called the Chynoweth method, using chopped IR radiation, has been used with reasonable success to provide dynamic figure of merit estimations. This method requires knowledge of the thermal conductivity, heat capacity, and infrared absorptivity of the test sample. For a thin-film test sample with a thermal-isolation layer, knowledge of the thermal conductivity and thickness of each layer would be required. Because thin-film thermal and optical properties vary widely, depending on the exact deposition process parameters, it cannot be assumed that these properties remain the same from sample to sample. It is also time consuming to determine these properties for each material to be tested. A test procedure based on a sample structure that requires minimal knowledge of thin-film material properties would be more useful.

While the prior art has reported the use of various test samples it has not established a basis for a specific test sample that is dedicated to the task of resolving the particular problem at hand. What is needed in this instance is a fabrication technique of a test sample designed expressly for the measurement of thin-film temperature responsivity.

SUMMARY OF THE INVENTION

It is therefore the object of the invention to provide a fabrication technique of a test sample for testing directly the temperature responsivity of a pyroelectric or ferroelectric thin-film infrared detector material.

According to the invention, there is disclosed a fabrication technique for a test sample structure to characterize pyroelectric and ferroelectric thin films for use in uncooled infrared focal lane arrays operated at a nominal 60 Hz. The test set chip is fabricated starting with a silicon wafer substrate with a thin electrically isolating thermal oxide layer. The $SO_2$ film must be thick enough to provide for electrical isolation from the silicon substrate (no pinholes), but thin enough to provide good thermal conduction. A guard layer is then made by depositing Cr and Pt on patterened photoresist. Excess material from the Cr/Pt layer is then lifted off. A layer of $ZrO_2$ is then blanket deposited. Isolation vias are etched into the $ZrO_2$. To overcome adhesion and stress problems with $ZrO_2$ the substrate is heated during deposition and thickness is no more than one micron. A bottom electrode pattern is then applied by depositing Cr and Pt, and excess material is lifted off. Sawlines are then delineated, the wafer sawed, and rinsed with acetone then methanol. A pyroelectric material is then deposited and then anneal to form a perovskite structure. Pattern vias are then applied, etched then cleaned. A pattern top electrode is then made by depositing a Cr and Pt layer with resultant excess material lifted off. A layer of $SiO_2$ is then deposited at 45° to cover steps. Pattern oxide vias are then etched into the $SiO_2$. A pattern heater layer is then made by depositing Cr and Pt, with excess material lifted off. Bonding pads are delineaned by depositing Cr and Au, with excess material lifted off. The resultant device is mounted in a chip carrier and Au wires are bonded from leads to a carrier.

BRIEF DESCRIPTION OF THE DRAWINGS

The foregoing and other objects, aspects and advantages will be better understood from the following detailed description of a preferred embodiment of the invention with reference to the drawings, in which:

The sole drawing FIGURE is a temperature profile of height above substrate versus temperature in the capacitor and thermometer of the resultant test unit cell fabricated from the technique of the present invention.

DETAILED DESCRIPTION OF A PREFERRED EMBODIMENT OF THE INVENTION

The fabrication technique of the present invention allows for the design of a test sample to characterize pyroelectric and ferroelectric thin films for use in uncooled IRFPAs operated at typical camera frame rates (nominally 60 Hz). The structure of the test sample permits measurable temperature fluctuations of the pyroelectric layer with respect to the substrate, and relatively uniform temperature throughout the pyroelectric layer itself. The pyroelectric layer is thermally insulated from the substrate by a thick film layer of ZrO2, a material with extremely low thermal conductance. The pyroelectric layer is sandwiched between metal layers to form a capacitor; the change in the electric field across this capacitor due to a change in the capacitor temperature (dE/dT) is to be measured. Most layers are patterned by a lift off technique, so that those layers are not subjected to corrosive chemicals. Layers that are not lifted off are chemically etched or ion milled. The resultant test sample allows the direct measurement of temperature responsivity of thin-film pyroelectric and ferroelectric detector materials.

The test set chip is fabricated starting with a silicon wafer substrate with a thin (1000–2000 Å) electrically isolating thermal oxide layer applied on top. A guard layer is then made by depositing Cr and Pt on patterned photoresist at approximate thickness of 50 Å and 1,000 Å respectively. The chromium is to help the platinum stick. An alternative of ruthenium oxide or other material may also be used. Excess material from the Cr/Pt layer is then lifted off. A layer of $ZrO_2$ is then blanket deposited at a one micron thickness. Isolation vias are etched into the $ZrO_2$. The thermal isolation layer of $ZrO_2$ must be deposited one micron thick, with low stress to avoid peeling or cracking during heat treatment of the ferroelectric material. An etchant is needed for each ferroelectric material, such as: a buffered oxide etch (BOE), an $HF/HNO_3/H_2O$ solution, or possibly a KOH mixture. To overcome adhesion and stress problems with $ZrO_2$, the substrate is heated during deposition and thickness is reduced to no more than one micron. The $SiO_2$ film must be thick enough to provide for electrical isolation from the silicon substrate (no pinholes), but thin enough to provide good thermal conduction. A bottom electrode pattern is then applied by depositing Cr and Pt, and excess material is lifted off. Sawlines are then delineated, the wafer sawed, and rinsed with acetone then methanol.

A pyroelectric material is then deposited and annealed to form a perovskite structure. Pattern vias are then applied, etched then cleaned. A pattern top electrode is then made by depositing a Cr and Pt layer of approximately 50 Å and 1,000 Å with resultant excess material lifted off. A layer of SiO$_2$ is then deposited at 45° with an approximate thickness of 1,500–2,000 Å to cover steps. Pattern oxide vias are then etched into the SiO$_2$. A pattern heater layer is then made by depositing Cr and Pt at approximately 50 A and 1,000 A, with excess material lifted off. Bonding pads are delineated by depositing Cr and Au at approximately 50 Å and 4,000 Å respectfully, with excess material lifted off. The resultant device is mounted in a chip carrier and Au wires are bonded from leads to a carrier.

The Pt was overcoated with the ZrO$_2$ to reduce hillock formation which can cause shorting of the bottom electrode to the top electrode. Reduction of hillock formation in Pt was also achieved by starting the deposition at a low base pressure ($10^{-7}$ torr). Heating the substrate to increase Pt density can also be optionally utilized to reduce hillock formation. The ZrO$_2$ layer, which is electron beam deposited is preferably done so with a raster beam to prevent a spray of contamination onto the device. If rastering is not available, the shutter should be closed each time the beam must be moved and opened after the film has started depositing at a uniform rate. Deposition of the SiO$_2$ for electrical isolation of the heater should be carried out at 45° to ensure good step coverage at the edges of the PRTs and electrodes, and to smooth the steps for a continuous film for the heater. The oxide should also be thicker than the thickest PRT/electrode deposit.

One extra thin-film thermometer is added to the fabrication technique of the present invention at the interface between the substrate and the ZrO$_2$ thermal isolation layer, resulting in a thin-film thermometer at each of the three main material interfaces. This extra thermometer allows characterization of the isolation layer thus allowing development of an issolation layer, the thermal conductance of which can be tailored to the detector layer's heat capacity, for an optimal thermal time constant.

The test set resultant from the fabrication technique consists of a capacitor fabricated on a thermal isolation material, with a guard layer beneath the isolation material. A resistance thermometer is incorporated at three levels, alongside each capacitor electrode and the guard layer (as thin-film platinum resistance thermometers), to measure the temperature at each level. An oxide layer on top of the entire structure electrically isolates the heater, which is used to vary the temperature of the structure to achieve 60 Hz temperature modulation. Platinum is used for the metal layers due to its stable material properties as a precision resistance thermometer material and since it is a common ferroelectric memory electrode material. By measuring temperature differences between interfaces, negligible error is realized due to self-heating of the platinum resistance thermometers, which cause the interface temperatures to be higher in the thermometer structure than in the capacitor structure; but the difference in temperature between the interface layers is verey close to the same in the two structures.

The functions of capacitor plates and thin-film thermometers are separate and laterally displaced in the invention to simplify the structure of the test sample. The thin-film thermometers require a serpentine pattern of metallization to achieve the desired nominal resistance. If the capacitor plates were combined, the computation of dielectric coefficient from capacitance becomes extremely complicated since the electric field fringe effect would play a major role. Also, the IR voltage drop from end to end of the thermometer (due to the non-zero read current) would produce a non-uniform electric field throughout the area of the capacitor, which would interfere with the measurement of dE/dT. With the separate structures of the present invention, the capacitor elements are used to measure dE, and the thermometer elements are used to measure dT.

The test set electronics consists of three thermometer circuits, one for each thin-film thermometer layer, with the thin-film thermometer in the feedback loop of an operational amplifier, and one circuit to buffer and amplify the signal developed across the thin-film pyroelectric capacitor. Each of these circuits is interfaced through a 12-bit analog-to-digital converter to a computer, permitting real-time digitization of the dynamic response as the thin-film heater is squarewave modulated. The test set is mounted on a computer-controlled thermoelectric stage. Calibration of the thin-film thermometers is achieved in a preliminary test step, in which the underlying thermoeletric stage is stepped through the temperature range of interest and the thin-film thermometer signal is sampled at each step. Calibration coefficients for the three thermometers are obtained from polynomial curve fits to this data. Quasi-static testing can also be accomplished with the same test setup. This setup can be used to determine the operating point at which dynamic testing is to be performed. In dynamic testing, the thermoelectric temperature stage is kept at a fixed temperature.

A temperature profile of height above the substrate versus temperature in the capacitor and thermometer (PRT) are shown in the sole drawing FIGURE. Lines 10 and 11 represent the temperature profile for the "heater on" for the thermometer and capacitor respectively. Lines 12 and 13 represent the temperature profile for "heater off" for the thermometer and capacitor respectively. Although the thermometer layers are hotter (due to thermometer self-heating) than the capacitor layers, the difference between heater-on and heater-off temperatures (distances 14 and 15) is very nearly equal (within milli -Kelvins). Therefore lateral separation between structures and different metallization patterns do not substantially affect the measurement accuracy of the delta T.

While this invention has been described in terms of preferred embodiment consisting of the technique disclosed, those skilled in the art will recognize that the invention can be practiced with modification within the spirit and scope of the appended claims.

What is claimed is:

1. A fabrication technique for a test sample to characterize pyroelectric and ferroelectric thin films for use in uncooled infrared focal plane arrays operated at an approximate 60 Hz modulation, the fabrication technique comprising:

applying a SiO$_2$ layer to a silicon wafer substrate to provide a thin electrically isolating thermal oxide layer;

depositing Cr and Pt to said thin electrically isolating thermal oxide layer to provide a guard layer and as a resistance thermometer;

lifting off excess material from the guard layer;

blanket depositing a layer of ZrO$_2$ to the guard layer;

etching isolation vias into said ZrO$_2$ layer;

depositing Cr and Pt to said etched ZrO$_2$ layer to provide a bottom electrode pattern and as a resistance thermometer;

lifting off excess Cr and Pt material from said bottom electrode pattern as a partially layered wafer;

delineating saw lines on said partially layered wafer;

sawing said wafer along said delineated saw lines as a machined wafer;

rinsing said machined wafer with acetone then methanol as a rinsed machined wafer;

depositing a pyroelectric film on said rinsed machined wafer;

annealing said pyroelectric film to form a perovskite;

etching isolation vias on said perovskite;

cleaning said etched perovskite isolation vias as a perovskite layer;

depositing a Cr and Pt layer on said perovskite layer to form a pattern top electrode and as a resistance thermometer;

lifting off resultant excess Cr and Pt material from said pattern top electrode to form a cleaned pattern top electrode;

depositing, at approximately 45 degrees Celsius, a layer of $SiO_2$ to cover steps on said cleaned pattern top electrode to provide a layered cleaned pattern top electrode;

ecthing isolation vias on said layered cleaned pattern top electrode;

depositing a Cr and Pt layer on said layered cleaned pattern top electrode to form a pattern heater layer;

lifting off resultant excess Cr and Pt material from said pattern heater layer;

depositing Cr and Au on said pattern heater layer for a bonding pads layer;

lifting off resultant excess material from said bonding pads layer to result in a test sample;

mounting said resultant test sample in a chip carrier, whereby energizing said pattern heater layer varies a temperature of the test unit cell to achieve the approximate 60 Hz modulation so that voltage measurements of resistance thermometer layers and electrode layers achieve a direct measurement of thin film temperature responsitivity.

* * * * *